US011938606B2

(12) United States Patent
Escolle

(10) Patent No.: US 11,938,606 B2
(45) Date of Patent: Mar. 26, 2024

(54) HYDRAULIC ROTARY-PERCUSSIVE HAMMER DRILL

(71) Applicant: MONTABERT, Saint-Priest (FR)

(72) Inventor: Michel Escolle, Nievroz (FR)

(73) Assignee: MONTABERT, Saint-Priest (FR)

( * ) Notice: Subject to any disclaimer, the term of this patent is extended or adjusted under 35 U.S.C. 154(b) by 149 days.

(21) Appl. No.: 17/725,869

(22) Filed: Apr. 21, 2022

(65) Prior Publication Data

US 2022/0339768 A1 Oct. 27, 2022

(30) Foreign Application Priority Data

Apr. 21, 2021 (FR) ..................................... 21/04176

(51) Int. Cl.
*E21B 6/02* (2006.01)
*B25D 9/12* (2006.01)
*B25D 17/06* (2006.01)

(52) U.S. Cl.
CPC ............... *B25D 9/12* (2013.01); *B25D 17/06* (2013.01); *E21B 6/02* (2013.01); *B25D 2217/0023* (2013.01); *B25D 2250/125* (2013.01); *B25D 2250/365* (2013.01)

(58) Field of Classification Search
CPC ... E21B 6/00; E21B 6/02; E21B 21/00; B25D 17/245; B25D 17/06
See application file for complete search history.

(56) References Cited

U.S. PATENT DOCUMENTS

| | | | | |
|---|---|---|---|---|
| 10,676,997 B2 | 6/2020 | Comarmond | | |
| 2011/0073373 A1* | 3/2011 | Rodert | ................. | B25D 17/005 175/94 |
| 2012/0285747 A1* | 11/2012 | Nilsson | ................... | E21B 21/02 175/293 |

FOREIGN PATENT DOCUMENTS

| | | | | |
|---|---|---|---|---|
| EP | 0058650 A1 | 8/1982 | | |
| EP | 0113654 A2 * | 7/1984 | ............. | E21B 21/01 |
| FR | 3026041 A1 | 3/2016 | | |
| WO | 2008100193 A1 | 8/2008 | | |
| WO | WO-2008100193 A1 * | 8/2008 | ............. | E21B 17/03 |
| WO | 2009148375 A1 | 12/2009 | | |
| WO | 2009148375 A8 | 12/2009 | | |

* cited by examiner

*Primary Examiner* — Giovanna Wright
(74) *Attorney, Agent, or Firm* — CANTOR COLBURN LLP

(57) ABSTRACT

The hydraulic rotary-percussive hammer drill includes a fluid injection portion including a fluid feed-in inlet and an annular inner groove fluidly connected to the fluid feed-in inlet; a shank including a fluid injection conduit fluidly connected to the annular inner groove; front and rear main sealing gaskets disposed on either side of the annular inner groove and configured to cooperate with a first shank portion of the shank; a rear backup sealing gasket located at the rear of the rear main sealing gasket and configured to cooperate with a second shank portion of the shank; a leakage passage defined between the shank and the fluid injection portion; pressure drop generation means configured to generate pressure drops in the leakage passage when a leakage flow flows in the leakage passage.

20 Claims, 4 Drawing Sheets

HYDRAULIC ROTARY-PERCUSSIVE HAMMER DRILL

CROSS REFERENCE TO RELATED APPLICATIONS

This application claims priority under 35 U.S.C. § 119 to the following French Patent Application No. FR 21/04176, filed on Apr. 21, 2021, the entire contents of which are incorporated herein by reference thereto.

FIELD OF THE INVENTION

The present invention concerns a hydraulic rotary-percussive hammer drill used more specifically on a drilling rig.

BACKGROUND

A drilling rig comprises, in a known manner, a hydraulic rotary-percussive hammer drill slidably mounted on a slide and driving one or several drill bar(s), the last one of these drill bars carrying a tool called cutter which is in contact with the rock. In general, such a hammer drill is intended to drill substantially deep holes primarily in order to be able to place explosive loads therein. Hence, the hammer drill is the main element of a drill rig which, on the one hand, imparts on the cutter the rotational and the percussion through the drill bars so as to penetrate the rock, and on the other hand, supplies an injection fluid so as to extract the debris from the drilled hole.

More particularly, the hammer drill comprises:

- a fluid injection portion comprising a longitudinal passage, a fluid feed-in inlet intended to be fluidly connected to an injection fluid source and an annular inner groove fluidly connected to the fluid feed-in inlet and opening into the longitudinal passage, and
- a shank intended to be coupled to the drill bars, the shank having a longitudinal axis and extending in the longitudinal passage of the fluid injection portion such that the annular inner groove of the fluid injection portion extends around the shank, the shank including a fluid injection conduit opening at a front end of the shank, and a communication orifice configured to fluidly connect the annular inner groove and the fluid injection conduit.

Thus, the injection fluid flows through the shank, the drill bars and the cutter, and expels the debris of materials to be drilled out of the hole during drilling.

In some applications, in particular in mines and underground quarries, water forms this injection fluid, which allows avoiding that rock dusts spread in the atmosphere when they comes out of the hole during drilling.

All of the used injection fluid should serve to the discharge of debris. To this end, front and rear main sealing gaskets, generally so-called "U" sealing gaskets, are disposed on either side of the annular inner groove provided in the fluid injection portion so as to contain the injection fluid in an injection chamber defined by the annular inner groove and the shank.

Given the rotational speed of the shank, the injection fluid pressure, the surface conditions, sometimes approximate, of the shank and the possible axe offsets of the shank caused by wear of guide elements provided on the hammer drill, the front and rear main sealing gaskets are worn and could let the injection fluid bleed out of the injection chamber, and in particular in the direction of pressurized and hydraulic areas of the hammer drill.

Yet, the presence of an injection fluid, incompressible and non-lubricant, in the aforementioned pressurized and hydraulic areas of the hammer drill rapidly results in irreversible consequences on the hammer drill, implying an immobilization of the latter, a production loss and very high repair costs. Indeed, when a non-lubricant fluid penetrates into the pressurized area of the hammer drill, this fluid gets in particular into rotary bearings of the hammer drill and could cause a jamming of the hammer drill. Depending on its nature, the injection fluid could corrode the interior of the hammer drill in the hydraulic area, and possibly the bearing surfaces of hydraulic gaskets, which causes some hydraulic leakage and requires the replacement of the damaged part besides the considered gaskets. Finally, if an incompressible fluid lies between the front of the striking piston and the receiving surface of the shank, therefore at the boundary of the pressurized and hydraulic areas, the pressure of this injection fluid increases quite considerably, which, given the very small clearances provided for in the hammer drill, results in displacing sealing gaskets of the hammer drill out of their receiving housings, and therefore immediately blocking the hammer drill. Yet, such a blockage of the hammer drill results in considerable repair costs.

To resist this injection fluid penetration into the inner portion of the hammer drill, it is known to place a so-called backup additional sealing gasket, at the rear of the rear main sealing gasket, and provide, on the injection portion and between the rear main sealing gasket and the rear backup sealing gasket, for a fluid discharge orifice extending substantially radially and opening into a leakage passage defined by a functional clearance between the shank and the injection portion. Such a fluid discharge orifice enables an injection fluid flowing in the leakage passage to come out of the hammer drill, because of a leakage of the rear main sealing gasket. Furthermore, the injection fluid discharge via this fluid discharge orifice is supposed to draw the attention of the operator so he stops the hammer drill and replaces the defective sealing gasket(s).

At the rear of the rear backup sealing gasket, lies the aforementioned pressurized area, which is swept by a compressible fluid stream, generally lubricated to limit wear and corrosion. The pressure of this compressible fluid limits injection fluid penetrations into the pressurized area.

However, in the case where a rear main sealing gasket leaks and the injection fluid is at a high pressure, the leakage is materialized by a wire-like or tubular shaped jet around the shank, over an angular portion of the latter or over the entirety of its circumference. A jet generated in this manner has a very high speed, and therefore a very high dynamic pressure. This injection fluid jet could raise the rear backup sealing gasket, flow between the latter and the shank and therefore penetrate into the pressurized area, whose static pressure is well below the dynamic pressure of the injection fluid. The hammer drill is then filled with the incompressible fluid and is damaged very rapidly. This phenomenon could occur with a static pressure measured in the leakage passage although lower than the pressurization pressure.

BRIEF SUMMARY

The present invention aims at overcoming these drawbacks.

Hence, the technical problem at the origin of the invention consists in providing a hydraulic rotary-percussive hammer drill which has a simple and economic structure, while limiting the risks of injection fluid penetration into an inner portion of the hammer drill receiving a rear portion of a shank and a striking piston of the hammer drill.

To this end, the present invention concerns a hydraulic rotary-percussive hammer drill including:

a hammer drill body, a fluid injection portion provided on a front portion of the hammer drill body, the fluid injection portion comprising a longitudinal passage, a fluid feed-in inlet intended to be fluidly connected to an injection fluid source and an annular inner groove fluidly connected to the fluid feed-in inlet and opening into the longitudinal passage, a shank intended to be coupled to at least one drill bar equipped with a tool, the shank having a longitudinal axis and extending in the longitudinal passage of the fluid injection portion, the annular inner groove extending around the shank, the shank including a fluid injection conduit extending over at least a portion of the length of the shank and a communication orifice configured to fluidly connect the annular inner groove and the fluid injection conduit, a striking piston slidably mounted inside the hammer drill body along a striking axis and configured to hit the shank, a front main sealing gasket and a rear main sealing gasket which are annular and each extending around the shank, the front and rear main sealing gaskets being fastened to the fluid injection portion and being disposed axially on either side of the annular inner groove, the front and rear main sealing gaskets being configured to tightly cooperate with a first shank portion of the shank, a rear backup sealing gasket which is annular and which extends around the shank, the rear backup sealing gasket being located at the rear of the rear main sealing gasket and being fastened to the fluid injection portion, the rear backup sealing gasket being configured to tightly cooperate with a second shank portion of the shank, a leakage passage which is defined between the shank and the fluid injection portion and which extends from the rear main sealing gasket up to the rear backup sealing gasket, a leakage flow being intended to flow in the leakage passage in case of injection fluid leakage at the rear main sealing gasket, at least one fluid discharge orifice which is provided on the fluid injection portion and which is fluidly connected to the leakage passage, the at least one fluid discharge orifice being configured to discharge the leakage flow flowing in the leakage passage outwardly of the hydraulic rotary-percussive hammer drill, characterized in that the first shank portion is generally cylindrical and has a first outer diameter, and the second shank portion is generally cylindrical and has a second outer diameter which is strictly larger than the first outer diameter, and in that the hydraulic rotary-percussive hammer drill includes pressure drop generation means disposed in the leakage passage and configured to generate pressure drops in the leakage passage when a leakage flow flows in the leakage passage, the pressure drop generation means including a deflection surface provided on the shank and located, and for example located axially, between the first shank portion and the second shank portion, the deflection surface being configured to divert a leakage flow, flowing in the leakage passage towards the rear backup sealing gasket, in a flow direction which is transverse to the longitudinal axis of the shank, that is to say which is secant with the longitudinal axis of the shank.

The presence of such pressure drop generation means within the leakage passage allows, in the event of a leakage of the rear main sealing gasket, substantially reducing the flow speed of a leakage flow flowing from the rear main sealing gasket and towards the rear backup sealing gasket, and therefore substantially reducing the dynamic pressure exerted on the rear backup sealing gasket.

Thus, the specific configuration of the hammer drill according to the present invention confers an increased service life on the rear backup sealing gasket, which reduces the frequency of replacement of the latter.

In addition, given the decrease in the dynamic pressure exerted on the rear backup sealing gasket by a possible leakage flow originating from the rear main sealing gasket, the pressurization pressure prevailing at the rear of the rear backup sealing gasket will be enough to resist a possible injection fluid intrusion into the pressurized portion of the hammer drill.

Consequently, the specific configuration of the hammer drill according to the present invention allows conferring enhanced reliability and safety of use on the latter.

The hydraulic rotary-percussive hammer drill may further have one or more of the following features, considered alone or in combination.

According to an embodiment of the invention, the pressure drop generation means are configured such that the leakage passage has a passage section which varies between the rear main sealing gasket and the rear backup sealing gasket.

According to an embodiment of the invention, the deflection surface is configured to divert the leakage flow from a flow direction substantially parallel to the longitudinal axis of the shank to a flow direction that is transverse to the longitudinal axis of the shank, that is to say which is secant with the longitudinal axis of the shank.

According to an embodiment of the invention, the deflection surface is configured to divert a leakage flow, flowing in the leakage passage towards the rear backup sealing gasket, such that the leakage flow deviates, that is to say gets away, from the longitudinal axis of the shank. In other words, the deflection surface extends towards the rear backup sealing gasket while deviating from the longitudinal axis of the shank.

According to an embodiment of the invention, the deflection surface is annular.

According to an embodiment of the invention, the deflection surface extends transversely to the longitudinal axis of the shank, that is to say according to a direction of extension that is secant with the longitudinal axis of the shank.

According to an embodiment of the invention, the deflection surface is inclined with respect to the longitudinal axis of the shank according to an angle of inclination comprised between 1 and 89°, and for example between 30 and 60°.

According to an embodiment of the invention, the deflection surface has a generally frustoconical shape.

According to another embodiment of the invention, the deflection surface extends substantially perpendicularly to the longitudinal axis of the shank.

According to another embodiment of the invention, the deflection surface diverges in the direction of the rear backup sealing gasket.

According to another embodiment of the invention, the deflection surface diverges in the direction of the rear main sealing gasket.

According to another embodiment of the invention, the deflection surface is at least partially formed by a concave surface portion which is curved and which has a radius of curvature.

According to an embodiment of the invention, the shank includes a deflection collar which is provided on an external surface of the shank and which includes the deflection surface.

According to an embodiment of the invention, the shank includes an annular groove provided on the outer surface of the shank is located, and for example located axially, between the first shank portion and the deflection surface, a minimum diameter of the annular groove being smaller than the first outer diameter of the first shank portion.

According to an embodiment of the invention, the leakage passage includes a discharge chamber which extends at least partially around the shank and which is located, and for example located axially, between the rear main sealing gasket and the rear backup sealing gasket, the at least one fluid discharge orifice opening into the discharge chamber.

According to an embodiment of the invention, the discharge chamber is annular.

According to an embodiment of the invention, the fluid injection portion includes an annular discharge groove opening into the longitudinal passage and partially delimiting the discharge chamber.

According to an embodiment of the invention, the deflection surface is configured to divert a leakage flow, flowing in the leakage passage in the direction of the rear backup sealing gasket, towards a bottom wall of the annular discharge groove.

According to an embodiment of the invention, the shank includes a connecting portion located axially between the first and second shank portions, the connecting portion including an outer circumferential surface having a surface roughness that is configured to generate pressure drops in the leakage passage when a leakage flow flows in the leakage passage, the pressure drop generation means being at least partially formed by the surface roughness of the outer circumferential surface.

According to an embodiment of the invention, the outer circumferential surface of the connecting portion has a surface roughness that is higher than the surface roughness of the outer circumferential surfaces of the first and second shank portions.

According to an embodiment of the invention, the fluid injection portion includes a rear intermediate portion which is located axially between the rear main sealing gasket and the rear backup sealing gasket, the rear intermediate portion including an inner circumferential surface having a surface roughness that is configured to generate pressure drops in the leakage passage when a leakage flow flows in the leakage passage, the pressure drop generation means being at least partially formed by the surface roughness of the inner circumferential surface.

According to an embodiment of the invention, the inner circumferential surface has a surface roughness which is higher than the surface roughness of the other inner circumferential surfaces of the fluid injection portion.

According to an embodiment of the invention, the hydraulic rotary-percussive hammer drill further comprises a rotational drive device configured to drive the shank in rotation about an axis of rotation substantially coincident with the striking axis.

According to an embodiment of the invention, the hydraulic rotary-percussive hammer drill further comprises:

a front backup sealing gasket which is annular and which extends around the shank, the front backup sealing gasket being located at the front of the front main sealing gasket and being fastened to the fluid injection portion, the front backup sealing gasket being configured to tightly cooperate with a third shank portion of the shank, an additional leakage passage which is defined between the shank and the fluid injection portion and which extends from the front main sealing gasket up to the front backup sealing gasket, a leakage flow being intended to flow in the additional leakage passage in case of injection fluid leakage at the front main sealing gasket, at least one additional fluid discharge orifice which is provided on the fluid injection portion and which is fluidly connected to the additional leakage passage, the at least one additional fluid discharge orifice being configured to discharge leakage flow flowing in the additional leakage passage outwardly of the hydraulic rotary-percussive hammer drill, additional pressure drop generation means disposed in the additional leakage passage and configured to generate pressure drops in the additional leakage passage when a leakage flow flows in the additional leakage passage.

According to an embodiment of the invention, the third shank portion is generally cylindrical and has a third outer diameter which is strictly smaller than the first outer diameter.

According to an embodiment of the invention, the fluid injection portion includes a first portion and a second portion respectively including a first inner surface and a second inner surface which are generally cylindrical, the front and rear main sealing gaskets being fastened in two annular fastening grooves respectively provided on the first and second inner surfaces.

According to an embodiment of the invention, the fluid injection portion includes a rear portion including a rear inner surface which is generally cylindrical, the rear backup sealing gasket being fastened in an annular fastening groove provided on the rear inner surface. The rear portion is disposed at the rear of the first and second portions.

According to an embodiment of the invention, the fluid injection portion includes a front portion including a front inner surface which is generally cylindrical, the front backup sealing gasket being fastened in an annular fastening groove provided on the front inner surface. The front portion is disposed at the front of the first and second portions.

According to an embodiment of the invention, the additional pressure drop generation means include an additional deflection surface provided on the fluid injection portion and located, and for example located axially, between the first shank portion and the third shank portion, the additional deflection surface being configured to divert a leakage flow, flowing in the additional leakage passage towards the front backup sealing gasket, in a flow direction that is transverse to the longitudinal axis of the shank, that is to say which is secant with the longitudinal axis of the shank.

According to an embodiment of the invention, the additional deflection surface is configured to divert the leakage flow from a flow direction substantially parallel to the longitudinal axis of the shank to a flow direction that is transverse to the longitudinal axis of the shank, that is to say which is secant with the longitudinal axis of the shank.

According to an embodiment of the invention, the additional deflection surface is configured to divert the leakage flow towards the longitudinal axis of the shank.

According to an embodiment of the invention, the front inner surface has an inner diameter that is smaller than the inner diameter of the first inner surface.

According to an embodiment of the invention, the additional deflection surface is annular and connects the front inner surface to the first inner surface.

According to an embodiment of the invention, the additional deflection surface is inclined with respect to the longitudinal axis of the shank according to an angle of inclination comprised between 1 and 89°, and for example between 30 and 60°.

According to an embodiment of the invention, the additional deflection surface converges in the direction of the front main sealing gasket.

According to an embodiment of the invention, the additional deflection surface converges in the direction of the front backup sealing gasket.

According to an embodiment of the invention, the additional leakage passage includes an additional discharge chamber which extends at least partially around the shank and which is located, and for example located axially, between the front main sealing gasket and the front backup sealing gasket, the at least one additional discharge orifice opening into the additional discharge chamber.

BRIEF DESCRIPTION OF THE FIGURES

The present invention will be better understood from the following description made with reference to the appended figures, wherein identical reference signs correspond to structurally and/or functionally identical or similar elements.

DETAILED DESCRIPTION

Figure 1:
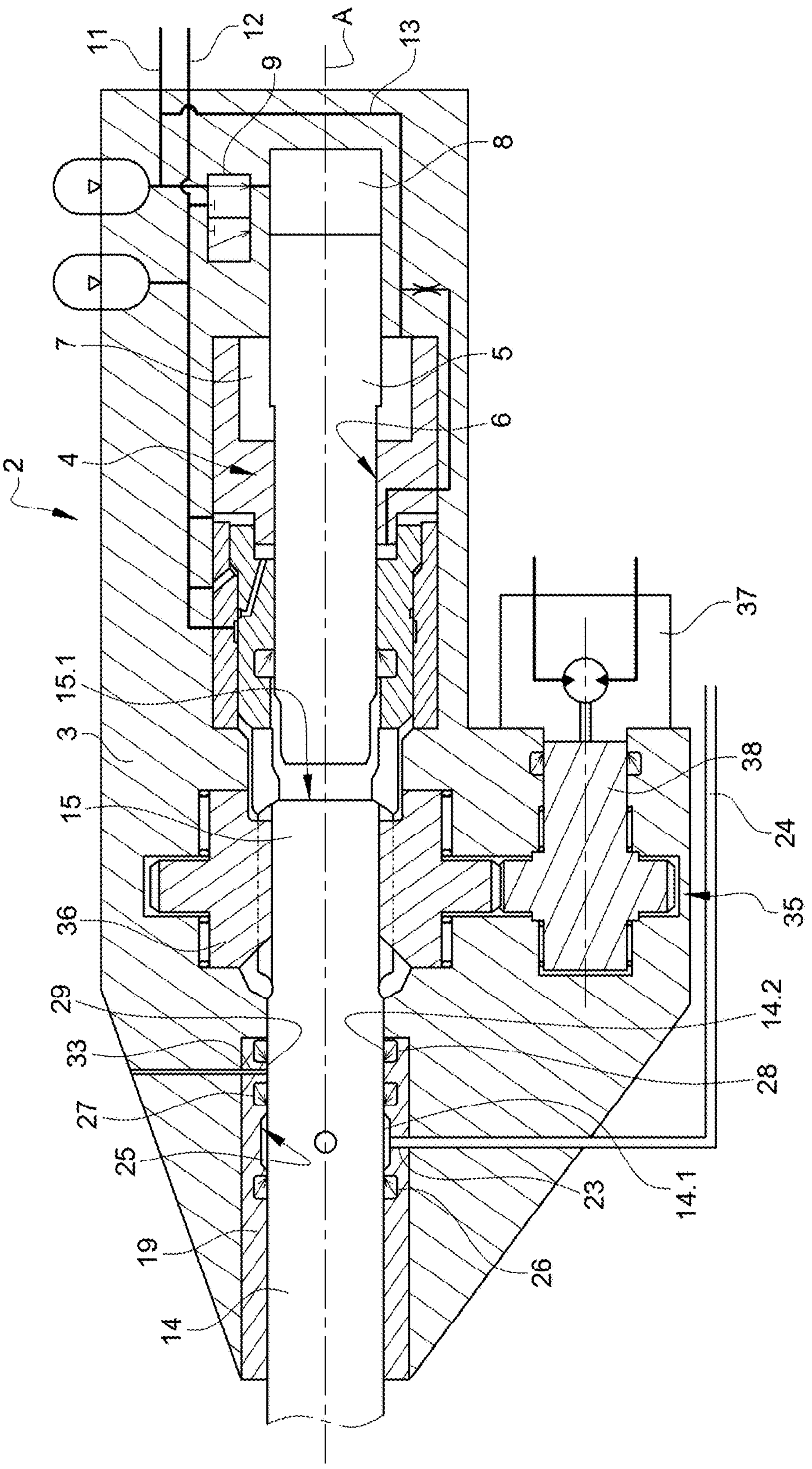
FIG. 1 is a schematic longitudinal sectional view of a hydraulic rotary-percussive hammer drill according to a first embodiment of the invention.
Figure 2:
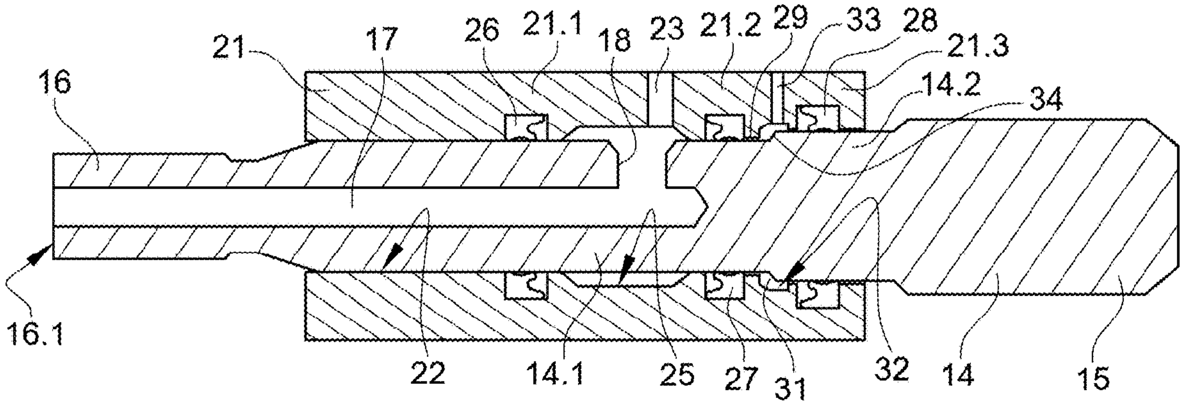
FIG. 2 is a partial longitudinal sectional view of the hydraulic rotary-percussive hammer drill of FIG. 1.

FIGS. 1 and 2 represent a first embodiment of a hydraulic rotary-percussive hammer drill 2 which is intended for the perforation of mine holes. More particularly, the hydraulic rotary-percussive hammer drill 2 includes a hammer drill body 3 which is configured to be slidably mounted on a slide (not represented in the figures) provided on a carrier machinery.

The hydraulic rotary-percussive hammer drill 2 comprises a striking system 4 including a striking piston 5 mounted so as to slide alternately within a piston cylinder 6, which is defined by the hammer drill body 3, along a striking axis A. The striking piston 5 and the piston cylinder 6 delimit a first control chamber 7 which is annular, and a second control chamber 8 which has a larger cross-section than that of the first control chamber 7 and which is antagonist to the first control chamber 7.

The striking system 4 further comprises a control distributor 9 arranged so as to control an alternating movement of the striking piston 5 inside the piston cylinder 6 alternately according to a striking stroke and a return stroke. The control distributor 9 is configured to set the second control chamber 8, alternately in connection with a high-pressure fluid feed-in conduit 11, such as a high-pressure incompressible fluid feed-in conduit, during the striking stroke of the striking piston 5, and with a low-pressure fluid return conduit 12, such as a low-pressure incompressible fluid return conduit, during the return stroke of the striking piston 5. Advantageously, the first control chamber 7 is permanently fed with a high-pressure fluid through a feed-in channel 13 connected to the high-pressure fluid feed-in conduit 11.

The high-pressure feed-in conduit 11 and the low-pressure fluid return conduit 12 belong to a main hydraulic feed-in circuit equipping the striking system 4.

The hydraulic rotary-percussive hammer drill 2 further includes a shank 14 intended to be coupled, in a known manner, to at least one drill bar (not represented in the figures) equipped with a tool, also called cutter. The shank 14 extends longitudinally according to a longitudinal axis which is advantageously coincident with the striking axis A, and includes a first end portion 15 directed towards the striking piston 5 and provided with an end face 15.1 against which the striking piston 5 is intended to hit during each operating cycle of the hydraulic rotary-percussive hammer drill 2, and a second end portion 16, opposite to the first end portion 15, intended to be coupled to the at least one drill bar.

The shank 14 includes a fluid injection conduit 17 extending longitudinally and opening into an end face 16.1 of the second end portion 16. In addition, the shank 14 includes a communication orifice 18 opening radially respectively into the fluid injection conduit 17 and into the external surface of the shank 14.

The hydraulic rotary-percussive hammer drill 2 further includes a fluid injection portion 19 provided on a front portion of the hammer drill body 3. For example, the fluid injection portion 19 could be removably mounted on the front portion of the hammer drill body 3.

According to the embodiment represented in FIGS. 1 and 2, the fluid injection portion 19 comprises an injection body 21 which is generally tubular and which is disposed around the shank 14. Thus, the injection body 21 includes a longitudinal passage 22 in which the shank 14 extends.

The injection body 21 further includes a fluid feed-in inlet 23 fluidly connected to a fluid conveying conduit 24 which is connected to an injection fluid source, and an annular inner groove 25 which extends around the shank 14 and into the bottom of which the fluid feed-in inlet 23 opens. The communication orifice 18 provided on the shank 14 opens into the annular inner groove 25 such that the fluid injection conduit 17 is fluidly connected to the fluid conveying conduit 24 via the annular inner groove 25 and the fluid feed-in inlet 23. For example, the injection fluid conveyed by the fluid conveying conduit 24 may consist of water or air.

In addition, the hydraulic rotary-percussive hammer drill 2 includes a front main sealing gasket 26 and a rear main sealing gasket 27 which are annular and each extending around the shank 14. The front and rear main sealing gaskets 26, 27 are disposed axially on either side of the annular inner groove 25, and are configured to tightly cooperate with a first shank portion 14.1 of the shank 14. For example, each of the front and rear main sealing gaskets 26, 27 may have a generally U-like shaped cross-section, and include an annular sealing lip configured to tightly cooperate with the first shank portion 14.1.

According to the embodiment represented in FIGS. 1 and 2, the injection body 21 includes a first portion 21.1 and a second portion 21.2 respectively including a first inner surface and a second inner surface which are generally cylindrical, the front and rear main sealing gaskets 26, 27 being fastened in two annular fastening grooves respectively provided on the first and second inner surfaces.

The hydraulic rotary-percussive hammer drill 2 also includes a rear backup sealing gasket 28 which is annular and which extends around the shank 14. The rear backup sealing gasket 28 is located at the rear of the rear main sealing gasket 27, and is configured to tightly cooperate with a second shank portion 14.2 of the shank 14.

According to the embodiment represented in FIGS. 1 and 2, the injection body 21 includes a rear portion 21.3 including a rear inner surface which is generally cylindrical, the rear backup sealing gasket 28 being fastened in an annular fastening groove provided on the rear inner surface.

According to the embodiment represented in FIGS. 1 and 2, the first shank portion 14.1 is generally cylindrical and has a first outer diameter, and the second shank portion 14.2 is generally cylindrical and has a second outer diameter which is strictly larger than the first outer diameter. Furthermore, the rear inner surface has an inner diameter which is larger than the inner diameter of the first inner surface.

In addition, the hydraulic rotary-percussive hammer drill 2 includes a leakage passage 29 which is defined between the shank 14 and the injection body 21 and which extends from the rear main sealing gasket 27 up to the rear backup sealing gasket 28. A leakage flow is intended to flow in the leakage passage 29 in the event of an injection fluid leakage at the rear main sealing gasket 27.

According to the embodiment represented in FIGS. 1 and 2, the leakage passage 29 has a passage section which varies between the rear main sealing gasket 27 and the rear backup sealing gasket 28, and includes in particular a discharge chamber 31 which is annular and which extends around the shank 14. The discharge chamber 31 is located axially between the rear main sealing gasket 27 and the rear backup sealing gasket 28. Advantageously, the injection body 21 includes an annular discharge groove 32 opening into the longitudinal passage 22 and partially delimiting the discharge chamber 31. The leakage passage 29 further includes an upstream passage portion defined by a functional clearance between the first shank portion 14.1 and the second inner surface, and a downstream passage portion defined by a functional clearance between the second shank portion 14.2 and the rear inner surface.

The hydraulic rotary-percussive hammer drill 2 also includes one or several fluid discharge orifice(s) 33 provided on the injection body 21 and opening, for example radially, into the discharge chamber 31. The or each fluid discharge orifice 33 is configured to discharge a leakage flow flowing in the leakage passage 29 outwardly of the hydraulic rotary-percussive hammer drill 2.

The hydraulic rotary-percussive hammer drill 2 further comprises pressure drop generation means disposed in the leakage passage 29 and configured to generate pressure drops in the leakage passage 29 when a leakage flow flows in the leakage passage 29.

According to the embodiment represented in FIGS. 1 and 2, the pressure drop generation means include a deflection surface 34 which is annular and which is provided on the shank 14. The deflection surface 34 connects the first shank portion 14.1 to the second shank portion 14.2.

According to the embodiment represented in FIGS. 1 and 2, the deflection surface 34 has a generally frustoconical shape and diverges in the direction of the rear backup sealing gasket 28. The deflection surface 34 is inclined with respect to the longitudinal axis of the shank 14 according to an angle of inclination comprised between 1 and 89°, for example between 30 and 60°, and advantageously about 45°. Nonetheless, according to an embodiment of the invention, the deflection surface 34 could extend substantially perpendicularly to the longitudinal axis of the shank 14. Such a configuration of the deflection surface 34 allows increasing even more the pressure drops generated within the leakage passage 29.

More particularly, the deflection surface 34 is configured to divert a leakage flow, flowing in the leakage passage 29 towards the rear backup sealing gasket 28, from a flow direction substantially parallel to the longitudinal axis of the shank 14 to a flow direction that is transverse to the longitudinal axis of the shank 14, that is to say which is secant with the longitudinal axis of the shank 14.

According to the embodiment represented in FIG. 2, the deflection surface 34 is configured to divert a leakage flow, flowing in the leakage passage 29 in the direction of the rear backup sealing gasket 28, towards a bottom wall of the annular discharge groove 32, and therefore such that the leakage flow deviates from the longitudinal axis of the shank 14.

Thus, in the case where the rear main sealing gasket 27 leaks and the injection fluid is high-pressure water, a water jet originating from the rear main sealing gasket 27 will be diverted at least a first time by the deflection surface 34 provided on the shank 14 and a second time by the bottom wall of the annular discharge groove 32 before loading the rear backup sealing gasket 28. These pressure drops, added to the enlargement of the section of the leakage passage 29 at the discharge chamber 31, will considerably limit the flow speed of the water jet and, thus, make the dynamic pressure exerted on the rear backup sealing gasket 28 drop. Therefore, the pressurization pressure prevailing at the rear of the rear backup sealing gasket 28 will be enough to resist a possible injection fluid intrusion into the pressurized portion of the hydraulic rotary-percussive hammer drill 2.

The hydraulic rotary-percussive hammer drill 2 also comprises a rotational drive system 35 which is configured to drive the shank 14 in rotation about an axis of rotation that is substantially coincident with the striking axis A. For example, the rotational drive system 35 includes a coupling member 36, such as a coupling pinion, which is tubular and which is disposed around the shank 14. The coupling member 36 comprises male coupling splines and female coupling splines which are coupled in rotation respectively with female and male coupling splines provided on the shank 14.

Advantageously, the coupling member 36 includes an outer peripheral toothing coupled in rotation with an output shaft of a drive motor 37, such as a hydraulic motor hydraulically powered by a hydraulic power supply outer circuit, belonging to the rotational drive system 35. For example, the rotational drive system 35 may include an intermediate pinion 38 which is coupled on the one hand to the output shaft of the drive motor 37 and on the other hand to the outer peripheral toothing of the coupling member 36.

When the hydraulic rotary-percussive hammer drill 2 is operating, the shank 14 is rotated thanks to the drive motor 37, and the shank 14 receives on its end face 15.1 the cyclic impacts of the striking piston 5, ensured by the striking system 4 fed by the main hydraulic feed-in circuit.

Figure 3:
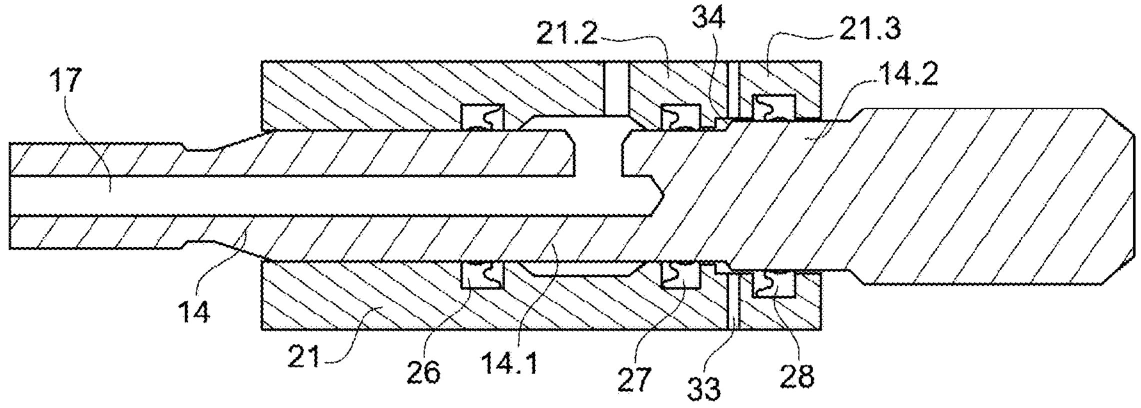
FIG. 3 is a partial longitudinal sectional view of a hydraulic rotary-percussive hammer drill according to a second embodiment of the invention.

FIG. 3 represents a hydraulic rotary-percussive hammer drill 2 according to a second embodiment of the invention which differs from the first embodiment essentially in that the injection body 21 has no annular discharge groove 32.

Figure 4:
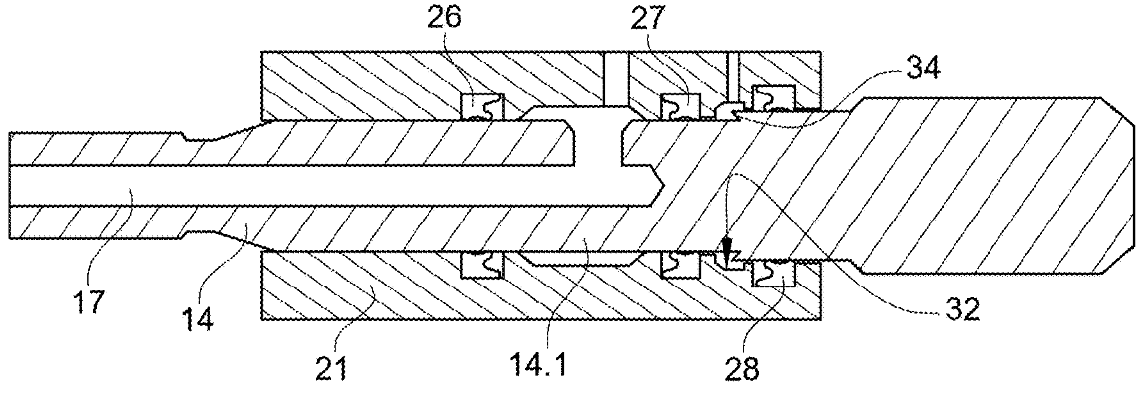
FIG. 4 is a partial longitudinal sectional view of a hydraulic rotary-percussive hammer drill according to a third embodiment of the invention.

FIG. 4 represents a hydraulic rotary-percussive hammer drill 2 according to a third embodiment of the invention which differs from the first embodiment essentially in that the deflection surface 34 is configured to direct a leakage flow, flowing in the leakage passage 29 in the direction of the rear backup sealing gasket 28, towards the rear main sealing gasket 27. Such a configuration of the deflection surface 34 allows increasing even more the pressure drops generated within the leakage passage 29. According to such an embodiment of the invention, the deflection surface 34 diverges in the direction of the rear main sealing gasket 27. According to such an embodiment of the invention, the deflection surface 34 is inclined with respect to the longitudinal axis of the shank 14 according to an angle of inclination comprised between 91 and 179°, for example between 120 and 150°, and advantageously about 135°.

Figure 5:
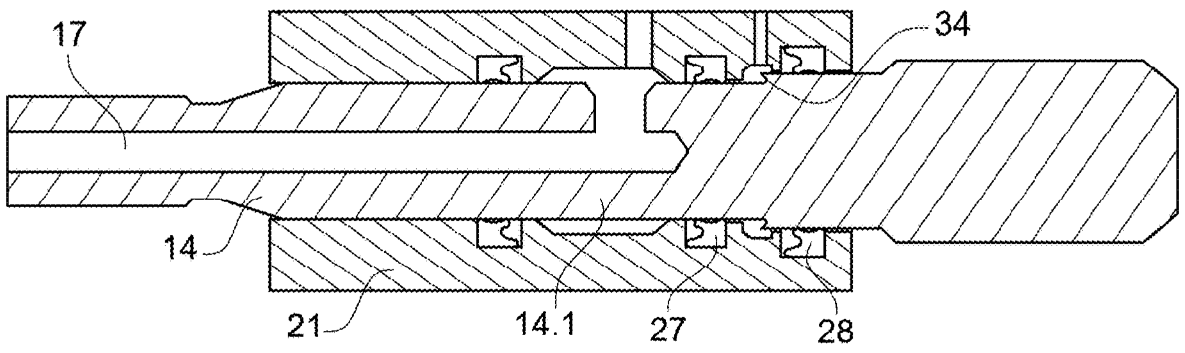
FIG. 5 is a partial longitudinal sectional view of a hydraulic rotary-percussive hammer drill according to a fourth embodiment of the invention.

FIG. 5 represents a hydraulic rotary-percussive hammer drill 2 according to a fourth embodiment of the invention which differs from the second embodiment essentially in that the deflection surface 34 is at least partially formed by a concave surface portion which is curved and which has a radius of curvature.

Figure 6:
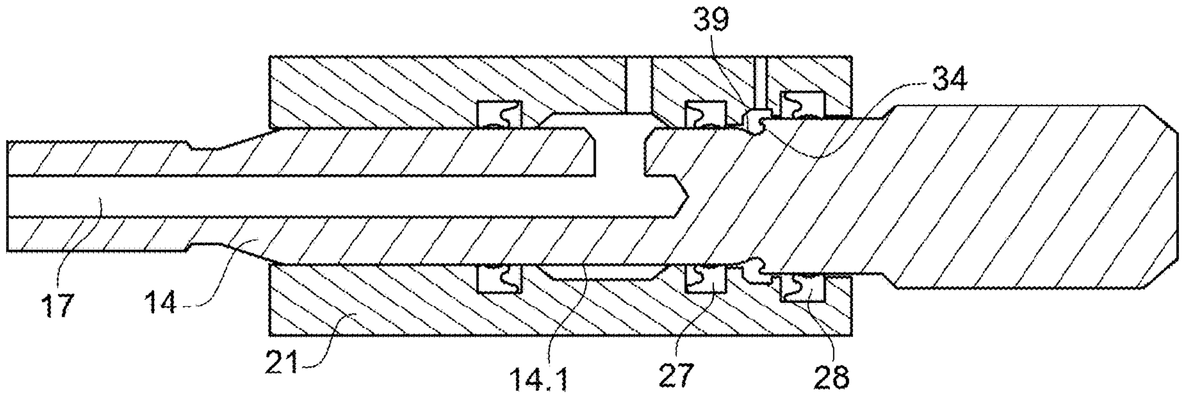
FIG. 6 is a partial longitudinal sectional view of a hydraulic rotary-percussive hammer drill according to a fifth embodiment of the invention.

FIG. 6 represents a hydraulic rotary-percussive hammer drill 2 according to a fifth embodiment of the invention which differs from the third embodiment essentially in that the shank 14 includes an annular groove 39 provided on the outer surface of the shank 14 and located axially between the first shank portion 14.1 and the deflection surface 34. Advantageously, the minimum diameter of the annular groove 39 is smaller than the first outer diameter of the first shank portion 14.1. Such a configuration of the shank 14 allows increasing even more the pressure drops generated within the leakage passage 29.

Figure 7:
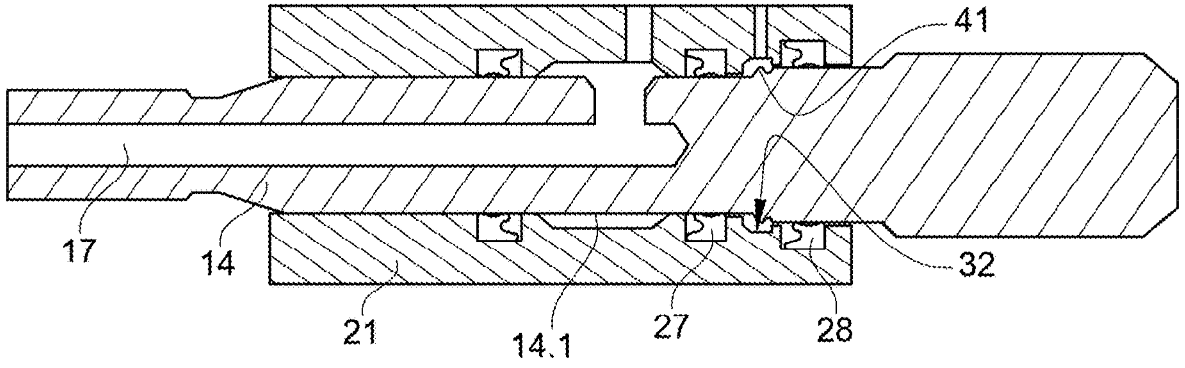
FIG. 7 is a partial longitudinal sectional view of a hydraulic rotary-percussive hammer drill according to a sixth embodiment of the invention.

FIG. 7 represents a hydraulic rotary-percussive hammer drill 2 according to a sixth embodiment of the invention which differs from the first embodiment essentially in that the shank 14 includes a deflection collar 41 which is provided on an external surface of the shank 14 and which includes the deflection surface 34.

Figure 8:
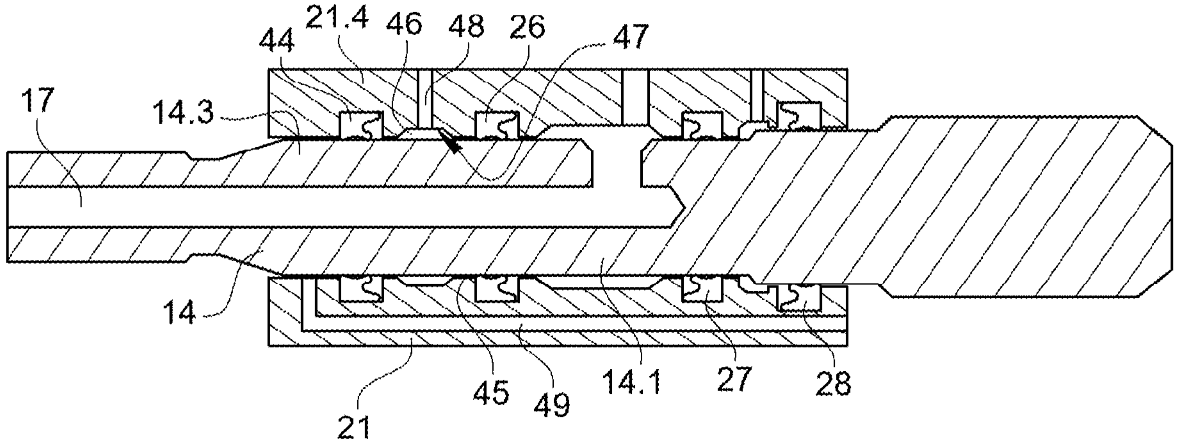
FIG. 8 is a partial longitudinal sectional view of a hydraulic rotary-percussive hammer drill according to a seventh embodiment of the invention.

FIG. 8 represents a hydraulic rotary-percussive hammer drill 2 according to a seventh embodiment of the invention which differs from the first embodiment essentially in that the hydraulic rotary-percussive hammer drill 2 further comprises a front backup sealing gasket 44 which is annular and which extends around the shank 14, the front backup sealing gasket 44 being located at the front of the front main sealing gasket 26 and which is configured to tightly cooperate with a third shank portion 14.3 of the shank 14.

According to the embodiment represented in FIG. 8, the injection body 21 includes a front portion 21.4 including a front inner surface which is generally cylindrical, the front backup sealing gasket 44 being fastened in an annular fastening groove provided on the front inner surface.

According to the embodiment represented in FIG. 8, the third shank portion 14.3 is generally cylindrical and has a third outer diameter which is substantially identical to the first outer diameter of the first shank portion 14.1, the front inner surface has an inner diameter which is substantially identical to the inner diameter of the first inner surface.

The hydraulic rotary-percussive hammer drill 2 further includes an additional leakage passage 45 which is defined between the shank 14 and the injection body 21 and which extends from the front main sealing gasket 26 up to the front backup sealing gasket 44. A leakage flow is intended to flow in the additional leakage passage 45 in case of an injection fluid leakage at the front main sealing gasket 26.

According to the embodiment represented in FIG. 8, the additional leakage passage 45 has a passage section which varies between the front main sealing gasket 26 and the front backup sealing gasket 44, and includes in particular an additional discharge chamber 46 which is annular and which extends around the shank 14. The additional discharge chamber 46 is located axially between the front main sealing gasket 26 and the front backup sealing gasket 44. Advantageously, the injection body 21 includes an additional annular discharge groove 47 opening into the longitudinal passage 22 and partially delimiting the additional discharge chamber 46.

The hydraulic rotary-percussive hammer drill 2 also includes one or several additional fluid discharge orifice(s) 48 provided on the injection body 21 and opening, for example radially, into the additional discharge chamber 46. The or each additional fluid discharge orifice 48 is configured to discharge a leakage flow flowing in the additional leakage passage 45 outwardly of the hydraulic rotary-percussive hammer drill 2.

According to the embodiment represented in FIG. 8, the injection body 21 includes a pressurization channel 49 which extends over at least a portion of the length of the main body and which opens substantially radially into the front inner surface. Such a pressurization channel 49 is fed with a pressurization fluid, generally compressible, ideally lubricated, allowing limiting the rotational and translational frictions between the shank 14 and the injection body 21.

Figure 9:
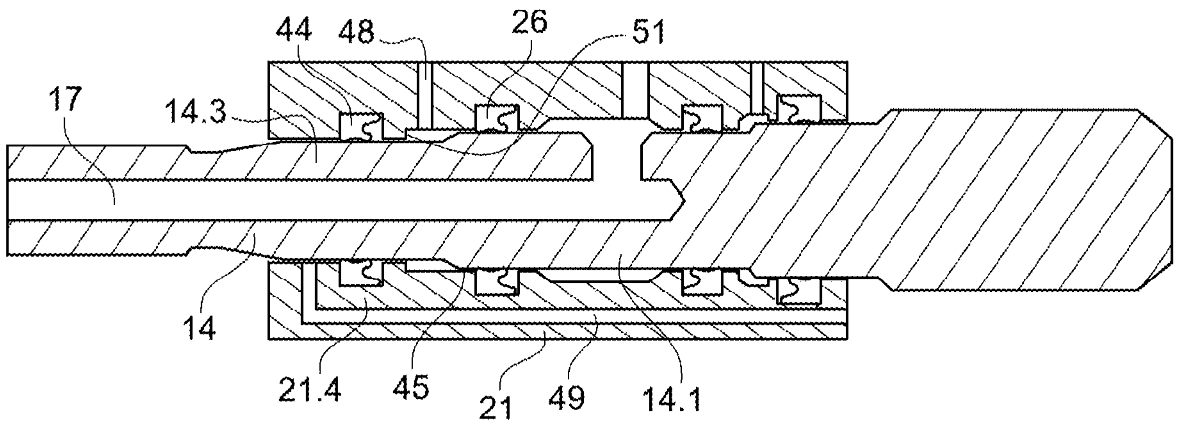
FIG. 9 is a partial longitudinal sectional view of a hydraulic rotary-percussive hammer drill according to an eighth embodiment of the invention.

FIG. 9 represents a hydraulic rotary-percussive hammer drill 2 according to an eighth embodiment of the invention which differs from the seventh embodiment essentially in that the third outer diameter of the third shank portion 14.3 is strictly smaller than the first outer diameter of the first shank portion 14.1, in that the front inner surface has an inner diameter which is smaller than the inner diameter of the first inner surface, and in that the hydraulic rotary-percussive hammer drill 2 includes additional pressure drop generation means disposed in the additional leakage passage 45 and configured to generate pressure drops in the additional leakage passage 45 when a leakage flow flows in the additional leakage passage 45.

According to the embodiment represented in FIG. 9, the pressure drop generation means include an additional deflection surface 51 which is annular and which is provided on the injection body 21. The additional deflection surface 51 connects the front inner surface to the first inner surface.

According to the embodiment represented in FIG. 9, the additional deflection surface 51 extends substantially perpendicularly to the longitudinal axis of the shank 14, and which is configured to divert a leakage flow, flowing in the additional leakage passage 45 towards the front backup sealing gasket 44, from a flow direction substantially parallel to the longitudinal axis of the shank 14 to a flow direction which is perpendicular to the longitudinal axis of the shank 14. Advantageously, the additional deflection surface 51 is configured to divert the leakage flow towards the longitudinal axis of the shank 14.

According to a variant of the invention, the additional deflection surface 51 may have a generally frustoconical shape and converge in the direction of the front backup sealing gasket 44. For example, the additional deflection surface 51 may be inclined with respect to the longitudinal axis of the shank 14 according to an angle of inclination comprised between 1 and 89°, for example between 30 and 60°, and advantageously about 45°.

Thus, in the case where the front main sealing gasket 26 leaks and the injection fluid is high-pressure water, a water jet originating from the front main sealing gasket 26 will be diverted at least a first time by the additional deflection surface 51 provided on the injection body 21 and a second time by the outer surface of the third shank portion 14.3 before loading the front backup sealing gasket 44. These pressure drops will considerably limit the flow speed of the water jet and, thus, make the dynamic pressure exerted on the front backup sealing gasket 44 drop. Therefore, an injection fluid leakage via the front main sealing gasket 26 could be discharged through the additional fluid discharge orifice(s) 48 without directly loading the front backup sealing gasket 44, such that its service life is considerably extended.

Furthermore, given that the dynamic pressure exerted by the injection fluid on the front backup sealing gasket 44 is considerably reduced, the pressurization pressure prevailing at the front of the front backup sealing gasket 44, because of the presence of the pressurization channel 49, will be enough to limit the risks of leakage fluid penetration via the pressurization channel in the pressurization area or the hydraulic area of the hydraulic rotary-percussive hammer drill. Hence, the presence of the additional deflection surface 51 allows increasing even more the reliability of the hydraulic rotary-percussive hammer drill 2 according to the present invention.

According to another variant of the invention, the additional deflection surface 51 may converge in the direction of the front main sealing gasket 26 and be configured to direct a leakage flow, flowing in the additional leakage passage 45 in the direction of the front backup sealing gasket 44, towards the front main sealing gasket 26. According to such an embodiment of the invention, the additional deflection surface 51 is inclined with respect to the longitudinal axis of the shank 14 according to an angle of inclination comprised between 91 and 179°, for example between 120 and 150°, and advantageously about 135°.

According to a variant of the invention, the injection body 21 may include a rear intermediate portion which would be located axially between the rear main sealing gasket 27 and the rear backup sealing gasket 28, and the rear intermediate portion would include an inner circumferential surface having a surface roughness configured to generate pressure drops in the leakage passage 29 (in addition to the pressure drops generated by the deflection surface 34) when a leakage flow flows in the leakage passage 29. According to such a variant of the invention, the pressure drop generation means would be formed by the deflection surface 34 and the surface roughness of the inner circumferential surface.

According to another embodiment of the invention, the shank 14 may include, in addition to the deflection surface 34, a connecting portion located axially between the first and second shank portions, the connecting portion including an outer circumferential surface having a surface roughness which is configured to generate pressure drops in the leakage passage (in addition to the pressure drops generated by the deflection surface 34) when a leakage flow flows in the leakage passage. According to such a variant of the invention, the pressure drop generation means would be formed by the deflection surface 34 and the surface roughness of the outer circumferential surface.

It goes without saying that the invention is not limited to the sole embodiments of this hydraulic rotary-percussive hammer drill, described hereinabove as examples, it encompasses on the contrary all variants thereof.

The invention claimed is:

1. A hydraulic rotary-percussive hammer drill including:

a hammer drill body, a fluid injection portion provided on a front portion of the hammer drill body, the fluid injection portion comprising a longitudinal passage, a fluid feed-in inlet intended to be fluidly connected to an injection fluid source and an annular inner groove fluidly connected to the fluid feed-in inlet and opening into the longitudinal passage, a shank intended to be coupled to at least one drill bar equipped with a tool, the shank having a longitudinal axis and extending in the longitudinal passage of the fluid injection portion, the annular inner groove extending around the shank, the shank including a fluid injection conduit extending over at least a portion of a length of the shank and a communication orifice configured to fluidly connect the annular inner groove and the fluid injection conduit, a striking piston slidably mounted inside the hammer drill body along a striking axis and configured to hit the shank, a front main sealing gasket and a rear main sealing gasket which are annular and each extending around the shank, the front and rear main sealing gaskets being fastened to the fluid injection portion and being disposed axially on either side of the annular inner groove, the front and rear main sealing gaskets being configured to tightly cooperate with a first shank portion of the shank, a rear backup sealing gasket which is annular and which extends around the shank, the rear backup sealing gasket being located at the rear of the rear main sealing gasket and being fastened to the fluid injection portion, the rear backup sealing gasket being configured to tightly cooperate with a second shank portion of the shank, a leakage passage which is defined between the shank and the fluid injection portion and which extends from the rear main sealing gasket up to the rear backup sealing gasket, a leakage flow being intended to flow in the leakage passage in case of injection fluid leakage at the rear main sealing gasket, at least one fluid discharge orifice which is provided on the fluid injection portion and which is fluidly connected to the leakage passage, the at least one fluid discharge orifice being configured to discharge the leakage flow flowing in the leakage passage outwardly of the hydraulic rotary-percussive hammer drill, wherein the first shank portion is generally cylindrical and has a first outer diameter, and the second shank portion is generally cylindrical and has a second outer diameter which is strictly larger than the first outer diameter, and in that the hydraulic rotary-percussive hammer drill includes pressure drop generation means disposed in the leakage passage and configured to generate pressure drops in the leakage passage when a leakage flow flows in the leakage passage, the pressure drop generation means including a deflection surface provided on the shank and located between the first shank portion and the second shank portion, the deflection surface being configured to divert a leakage flow, flowing in the leakage passage towards the rear backup sealing gasket, in a flow direction which is transverse to the longitudinal axis of the shank.

2. The hydraulic rotary-percussive hammer drill according to claim 1, wherein the pressure drop generation means are configured such that the leakage passage has a passage section that varies between the rear main sealing gasket and the rear backup sealing gasket.

3. The hydraulic rotary-percussive hammer drill according to claim 2, wherein the deflection surface is configured to divert a leakage flow, flowing in the leakage passage towards the rear backup sealing gasket, such that the leakage flow deviates from the longitudinal axis of the shank.

4. The hydraulic rotary-percussive hammer drill according to claim 3, wherein the deflection surface is annular.

5. The hydraulic rotary-percussive hammer drill according to claim 4, wherein the deflection surface extends transversely to the longitudinal axis of the shank.

6. The hydraulic rotary-percussive hammer drill according to claim 5, wherein the deflection surface is inclined with respect to the longitudinal axis of the shank according to an angle of inclination comprised between 1 and 89°.

7. The hydraulic rotary-percussive hammer drill according to claim 1, wherein the deflection surface is configured to divert a leakage flow, flowing in the leakage passage towards the rear backup sealing gasket, such that the leakage flow deviates from the longitudinal axis of the shank.

8. The hydraulic rotary-percussive hammer drill according to claim 1, wherein the deflection surface is annular.

9. The hydraulic rotary-percussive hammer drill according to claim 1, wherein the deflection surface extends transversely to the longitudinal axis of the shank.

10. The hydraulic rotary-percussive hammer drill according to claim 9, wherein the deflection surface is inclined with respect to the longitudinal axis of the shank according to an angle of inclination comprised between 1 and 89°.

11. The hydraulic rotary-percussive hammer drill according to claim 10, wherein the angle of inclination is comprised between 30 and 60°.

12. The hydraulic rotary-percussive hammer drill according to claim 10, wherein the angle of inclination is comprised between 30 and 60°.

13. The hydraulic rotary-percussive hammer drill according to claim 1, wherein the shank includes a deflection collar which is provided on an external surface of the shank and which includes the deflection surface.

14. The hydraulic rotary-percussive hammer drill according to claim 1, wherein the shank includes an annular groove provided on an outer surface of the shank is located between the first shank portion and the deflection surface, a minimum diameter of the annular groove being smaller than the first outer diameter of the first shank portion.

15. The hydraulic rotary-percussive hammer drill according to claim 1, wherein the leakage passage includes a discharge chamber which extends at least partially around the shank and which is located between the rear main sealing gasket and the rear backup sealing gasket, the at least one fluid discharge orifice opening into the discharge chamber.

16. The hydraulic rotary-percussive hammer drill according to claim 1, wherein the shank includes a connecting portion located axially between the first and second shank portions, the connecting portion including an outer circumferential surface having a surface roughness that is configured to generate pressure drops in the leakage passage when a leakage flow flows in the leakage passage, the pressure drop generation means being at least partially formed by the surface roughness of the outer circumferential surface.

17. The hydraulic rotary-percussive hammer drill according to claim 1, wherein the fluid injection portion includes a rear intermediate portion which is located axially between the rear main sealing gasket and the rear backup sealing gasket, the rear intermediate portion including an inner circumferential surface having a surface roughness that is configured to generate pressure drops in the leakage passage when a leakage flow flows in the leakage passage, the pressure drop generation means being at least partially formed by the surface roughness of the inner circumferential surface.

18. The hydraulic rotary-percussive hammer drill according to claim 1, further comprising:

a front backup sealing gasket which is annular and which extends around the shank, the front backup sealing gasket being located at the front of the front main sealing gasket and being fastened to the fluid injection portion, the front backup sealing gasket being configured to tightly cooperate with a third shank portion of the shank, an additional leakage passage which is defined between the shank and the fluid injection portion and which extends from the front main sealing gasket up to the front backup sealing gasket, a leakage flow being intended to flow in the additional leakage passage in case of injection fluid leakage at the front main sealing gasket, at least one additional fluid discharge orifice which is provided on the fluid injection portion and which is fluidly connected to the additional leakage passage, the at least one additional fluid discharge orifice being configured to discharge leakage flow flowing in the additional leakage passage outwardly of the hydraulic rotary-percussive hammer drill, additional pressure drop generation means disposed in the additional leakage passage and configured to generate pressure drops in the additional leakage passage when a leakage flow flows in the additional leakage passage.

19. The hydraulic rotary-percussive hammer drill according to claim 18, wherein the third shank portion is generally cylindrical and has a third outer diameter which is strictly smaller than the first outer diameter.

20. The hydraulic rotary-percussive hammer drill according to claim 19, wherein the additional pressure drop generation means include an additional deflection surface provided on the fluid injection portion and located between the first shank portion and the third shank portion, the additional deflection surface being configured to divert a leakage flow, flowing in the additional leakage passage towards the front backup sealing gasket, in a flow direction that is transverse to the longitudinal axis of the shank.

* * * * *